US009357091B2

(12) United States Patent
Zhang

(10) Patent No.: US 9,357,091 B2
(45) Date of Patent: *May 31, 2016

(54) INFORMATION INPUT METHOD, APPARATUS AND SYSTEM FOR ASSOCIATED APPARATUS OF IMAGING DEVICE

(71) Applicant: APEX MICROELECTRONICS CO., LTD, Zhuhai, Guangdong Province (CN)

(72) Inventor: Hao Zhang, Zhuhai (CN)

(73) Assignee: APEX MICROELECTRONICS CO., LTD., Zhuhai, Guangdong (CN)

( * ) Notice: Subject to any disclaimer, the term of this patent is extended or adjusted under 35 U.S.C. 154(b) by 203 days.

This patent is subject to a terminal disclaimer.

(21) Appl. No.: 14/159,083

(22) Filed: Jan. 20, 2014

(65) Prior Publication Data

US 2014/0132987 A1    May 15, 2014

Related U.S. Application Data

(63) Continuation-in-part of application No. 12/529,820, filed as application No. PCT/CN2009/070021 on Jan. 20, 2009, now Pat. No. 8,666,263.

(30) Foreign Application Priority Data

Jul. 23, 2008  (CN) .......................... 2008 1 0134727

(51) Int. Cl.
| | | |
|---|---|---|
| G03G 15/00 | (2006.01) | |
| H04N 1/00 | (2006.01) | |
| G03G 21/18 | (2006.01) | |
| H04L 12/24 | (2006.01) | |
| G06K 15/00 | (2006.01) | |

(52) U.S. Cl.
CPC ......... *H04N 1/0083* (2013.01); *G03G 21/1878* (2013.01); *G03G 21/1882* (2013.01); *H04L 41/082* (2013.01); *G03G 2215/0695* (2013.01); *G03G 2221/1823* (2013.01); *G06K 15/40* (2013.01)

(58) Field of Classification Search
None
See application file for complete search history.

(56) References Cited

U.S. PATENT DOCUMENTS

| 6,351,621 B1 | 2/2002 | Richards et al. |
| 6,385,407 B1 | 5/2002 | Inose |

(Continued)

FOREIGN PATENT DOCUMENTS

| CN | 1127390 A | 7/1996 |
| CN | 1467578 A | 1/2004 |

(Continued)

OTHER PUBLICATIONS

Extended European Search Report dated Feb. 27, 2012; Appln. No. 09799937.9-1240 /2328106 PCT/CN2009070021.

(Continued)

*Primary Examiner* — David Gray
*Assistant Examiner* — Geoffrey Evans
(74) *Attorney, Agent, or Firm* — Ladas & Parry LLP

(57) ABSTRACT

An information input method, apparatus and system for an associated apparatus of an imaging device are provided. The system includes a chip and an information input apparatus; the chip is adapted to store universal information, and alternative information sent by the information input apparatus; the information input apparatus is adapted to store and send to the chip the alternative information.

19 Claims, 2 Drawing Sheets

(56) References Cited

U.S. PATENT DOCUMENTS

| | | | |
|---|---|---|---|
| 6,694,106 B2 | 2/2004 | Yoshimura | |
| 6,704,521 B2 | 3/2004 | Isobe et al. | |
| 6,817,693 B2 | 11/2004 | Phillips et al. | |
| 6,826,376 B2 | 11/2004 | An et al. | |
| 7,027,744 B2 | 4/2006 | Simpson et al. | |
| 7,043,166 B2 | 5/2006 | Parry et al. | |
| 7,101,012 B2 | 9/2006 | Kosugi et al. | |
| 7,101,014 B2 | 9/2006 | Johnson et al. | |
| 7,136,608 B2 | 11/2006 | Miller | |
| 7,177,552 B2 | 2/2007 | Koike | |
| 7,187,874 B1 | 3/2007 | Miller | |
| 7,286,772 B2 | 10/2007 | Hwang | |
| 7,375,834 B2 | 5/2008 | Van Der Meijs | |
| 7,391,967 B2 | 6/2008 | Shizukuishi | |
| 7,440,704 B2 | 10/2008 | Kobayashi | |
| 7,515,837 B2 | 4/2009 | Thacker et al. | |
| 7,664,408 B2 | 2/2010 | Watanabe et al. | |
| 7,970,292 B2 | 6/2011 | Kim et al. | |
| 8,023,137 B2 | 9/2011 | Yasui et al. | |
| 8,508,770 B2 | 8/2013 | Lee et al. | |
| 8,532,506 B2 | 9/2013 | Jones et al. | |
| 8,547,577 B2 | 10/2013 | Paul et al. | |
| 8,554,090 B2 | 10/2013 | Cachia et al. | |
| 8,554,091 B2 | 10/2013 | Homma et al. | |
| 8,666,263 B2* | 3/2014 | Zhang | 358/1.14 |
| 9,030,682 B2* | 5/2015 | Thacker, III | G06K 15/40 358/1.1 |
| 2001/0005457 A1 | 6/2001 | Serizawa | |
| 2002/0081873 A1 | 6/2002 | Harris et al. | |
| 2002/0093698 A1 | 7/2002 | Kagawa | |
| 2002/0140966 A1 | 10/2002 | Meade, II et al. | |
| 2002/0176711 A1 | 11/2002 | Shizukuishi | |
| 2003/0002899 A1* | 1/2003 | Furukawa | B41J 2/04541 400/120.01 |
| 2003/0225971 A1 | 12/2003 | Oishi et al. | |
| 2004/0161251 A1 | 8/2004 | Ito et al. | |
| 2005/0120260 A1 | 6/2005 | Suzuki et al. | |
| 2005/0151776 A1 | 7/2005 | Johnson et al. | |
| 2005/0271415 A1 | 12/2005 | Burchette et al. | |
| 2006/0029400 A1 | 2/2006 | Nasu | |
| 2006/0245767 A1 | 11/2006 | Burchette et al. | |
| 2007/0019970 A1 | 1/2007 | Kim et al. | |
| 2007/0147853 A1 | 6/2007 | Cho et al. | |
| 2007/0201882 A1 | 8/2007 | Chan | |
| 2008/0118253 A1 | 5/2008 | Abe | |
| 2008/0170866 A1 | 7/2008 | Thacker et al. | |
| 2008/0260418 A1 | 10/2008 | Karagiannis et al. | |
| 2009/0010658 A1 | 1/2009 | Chan | |
| 2009/0041480 A1 | 2/2009 | Jeon | |
| 2010/0232814 A1 | 9/2010 | Kim | |
| 2013/0236197 A1 | 9/2013 | Yoshida et al. | |
| 2015/0206039 A1* | 7/2015 | Liu | G06F 21/608 358/1.15 |

FOREIGN PATENT DOCUMENTS

| | | |
|---|---|---|
| CN | 1550924 A | 12/2004 |
| CN | 1219262 C | 9/2005 |
| CN | 1991633 A | 7/2007 |
| CN | 101387816 A | 3/2009 |
| GB | 2251406 A | 7/1992 |
| JP | 2000-057273 A | 2/2000 |
| JP | 2000-357211 A | 12/2000 |
| JP | 2003-036295 A | 2/2003 |
| JP | 2003-084631 A | 3/2003 |
| JP | 2004-030028 A | 1/2004 |
| JP | 2006-172287 A | 6/2006 |
| JP | 2007-328280 A | 12/2007 |
| KR | 10-0764744 B1 | 10/2007 |
| KR | 100769738 B1 | 10/2007 |

OTHER PUBLICATIONS

International Search Report mailed May 14, 2009; PCT/CN2009/070021.

First Japanese Office Action dated Sep. 26, 2012; Appln. No. 2011-519010.

First Korean Office Action dated Aug. 20, 2012; Appln. No. 10-2011-7003908.

USPTO NFOA dated Jun. 22, 2012 in connection with U.S. Appl. No. 12/529,820.

USPTO FOA dated Dec. 6, 2012 in connection with U.S. Appl. No. 12/529,820.

USPTO NFOA dated Jun. 24, 2013 in connection with U.S. Appl. No. 12/529,820.

USPTO NOA mailed Oct. 21, 2013 in connection with U.S. Appl. No. 12/529,820.

* cited by examiner

INFORMATION INPUT METHOD, APPARATUS AND SYSTEM FOR ASSOCIATED APPARATUS OF IMAGING DEVICE

This application is a Continuation-In-Part application of the U.S. application Ser. No. 12/529,820, which claims the benefit of Chinese patent application 200810134727.3, entitled "Information input method, apparatus and system for associated apparatus of imaging device", and filed with the Chinese Patent Office on Jul. 23, 2008, the content of which is hereby incorporated by reference in its entirety.

FIELD OF THE INVENTION

The present invention relates to the field of imaging, and in particular, to an information input method, apparatus and system for an associated apparatus of an imaging device.

BACKGROUND OF THE INVENTION

Due to the increasing needs for imaging devices such as printers, copiers and fax machines, the needs for various exchangeable imaging cartridges, e.g. ink cartridge, associated with imaging devices are also increasing.

Generally, an imaging cartridge includes a chip, where communication protocols for communication with a particular type of imaging devices and chip data are stored. Chip data includes, e.g., model of the imaging cartridge, management data for imaging cartridge ink, and characterize data and control data corresponding to the type of the imaging device. A particular type of chips where corresponding communication protocols and chip data are stored are installed in a particular type of imaging cartridges which can only be used in conjunction with a particular type of imaging devices. Therefore, as the numbers of imaging cartridge and imaging device types increase, imaging cartridge manufactures have to store different types of chips so that imaging cartridges which can be equipped on different types of imaging devices can be produced.

In order to overcome this drawback, universal chips have been invented. For example, U.S. Pat. No. 7,088,928 discloses a universal chip, the system of which determines through the chip whether an imaging device is a first type imaging device or a second type imaging device; if the imaging device is a first type imaging device, the chip is operated in first operation mode; and if the imaging device is a second type imaging device, the chip is operated in second operation mode. In the universal chip system, the chip used together with the imaging cartridge in the imaging device includes a storage element for storing imaging cartridge data and a controller for controlling operation of the chip and determining whether the imaging device is a first type imaging device or a second type imaging device. If the imaging device is a first type imaging device, the controller is adapted to operate the chip in first mode, and if the imaging device is a second type imaging device, the controller is adapted to operate the chip in second mode. The storage element of the universal chip requires a lot of space to store data for each type of imaging devices, and the controller of the universal chip needs complex and long programs to distinguish each type of imaging devices, therefore required resource space is large and manufacture cost of the universal chip is expensive.

SUMMARY OF THE INVENTION

Embodiments of the invention provide an information input method, apparatus and system for an associated apparatus of an imaging device, which can improves compatibility of a chip and lower manufacture cost of the chip.

An embodiment of the invention provides an associated system of an imaging cartridge, including:
a chip and an information input apparatus;
wherein the chip is adapted to store universal information, and alternative information sent by the information input apparatus;
the information input apparatus is adapted to store and send to the chip the alternative information.

An embodiment of the invention further provides a chip, including:
a storage unit, adapted to store universal information and alternative information;
a communication interface unit, adapted to provide a communication interface for communication between an external device and the chip;
a chip control unit, adapted to control communication between the chip and the external device.

An embodiment of the invention further provides an information input apparatus, including:
a display unit, an input unit, a control unit, a power unit, and a chip interface unit;
wherein the display unit is adapted to display a working status and an information indication of the information input apparatus;
the input unit is adapted to input to the control unit an instruction providing alternative information;
the control unit is adapted to receive the instruction inputted by the input unit, extract the alternative information, and send the alternative information to the chip through the chip interface unit;
the power unit is adapted to provide power for the information input apparatus;
the chip interface unit is adapted to provide a communication interface for communication between the information input apparatus and the chip.

An embodiment of the invention further provides an information input method for a chip, including:
storing universal information into the chip;
storing alternative information into the chip after storing the universal information.

As can be seen from the embodiments of the invention, an improvement is made based on existing chips, and an associated information input apparatus is provided. Chip data can be input by two steps: universal information is already stored in a chip when the chip is produced, and when the chip is provided to a user, the user can input alternative information to the chip through an associated information input apparatus. Therefore, it is possible for a particular type of chips to be installed on multiple types of imaging devices, and chip compatibility is greatly improved.

DETAILED DESCRIPTION OF THE INVENTION

The objects, characteristics and advantages of the invention will be easily understood by reference to the following description of embodiments when read in conjunction with the accompanying drawings.

Please note that combinations of universal information and alternative information in the embodiments of the invention can include the following four combinations, and the alternative information can be the alternative information in the following combinations:

Combination 1:

The universal information includes: a common part of communication protocols between the chip and different types of imaging devices;

The alternative information includes: a difference part of the communication protocols between the chip and different types of imaging devices, and chip data for the chip to be applied to different types of imaging devices.

Combination 2:

The universal information includes: a common part of communication protocols between the chip and different types of imaging devices, and a common part of chip data for the chip to be applied to different types of imaging devices;

The alternative information includes: a difference part of the communication protocols between the chip and different types of imaging devices, and a difference part of chip data for the chip to be applied to different types of imaging devices.

Combination 3:

The universal information includes: a universal communication protocol between the chip and different types of imaging devices;

The alternative information includes: chip data for the chip to be applied to different types of imaging devices.

Combination 4:

The universal information includes: a universal communication protocol between the chip and different types of imaging devices, and a common part of chip data for the chip to be applied to different types of imaging devices;

The alternative information includes: a difference part of chip data for the chip to be applied to different types of imaging devices.

The above communication protocol refers to an agreement between the chip and the imaging device. The agreement is a regulation of, e.g., data format, synchronization method, transmission speed, transmission procedure, error detection and correction method, and control character definition, and is followed by both parties. During manufacture, a basic part of the communication protocol is inputted to the chip, including data format, synchronization method, transmission speed, transmission procedure, error detection and correction method, and control character definition.

Figure 1:
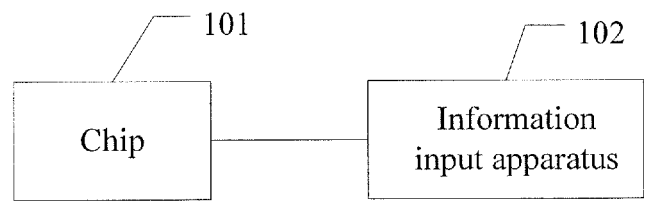
FIG. 1 is a structural diagram of an associated system of an imaging cartridge according to an embodiment of the invention.

FIG. 1 illustrates the structure of an associated system of an imaging cartridge according to an embodiment of the invention:

The associated system of an imaging cartridge includes: a chip 101 and an information input apparatus 102. And:

the chip 101 is adapted to store universal information, and alternative information sent by the information input apparatus;

the information input apparatus 102 is adapted to store and input to the chip the alternative information.

Communication between the chip 101 and the information input apparatus 102 can be done in two ways: wired or wireless.

The wired way refers to that, the associate system of an imaging cartridge includes a connection apparatus adapted to provide a transmission channel for the communication between the information input apparatus 102 and the chip 101. The information input apparatus 102 performs the communication after the connection apparatus connects a contact on the chip 101. The contact can be a contact which is used for the communication between the chip 101 and an imaging device. Please note that, for chips of different contact structure types, the corresponding connection apparatus are different. Resistance with different resistivity can be set in the connection apparatus, so that when the connection apparatus connects the input apparatus and the input apparatus is powered on, the input apparatus can determine the type of the connection apparatus in use and further determines which contact structure is the chip in use. Chips of the same contact structure type may include chips using one or more communication protocols. Therefore the input apparatus can determine one or more communication protocols that the chip might support based on the contact structure type of the chip, and communicates with the chip via the communication protocol. If the chip response correctly, the communication protocol in use is the communication protocol corresponding to the chip.

The wireless way refers to that, if the chip 101 is a wireless chip, there may be no connection apparatus. Information is transmitted directly by a chip interface unit for the chip and the information input apparatus 102, such as a coil, an infrared interface and any module that may implement wireless communication.

During the above wired or wireless communication, the information input apparatus 102 and the chip 101 can communicate according to a communication protocol between the information input apparatus 102 and the chip 101, or communication according to a communication protocol between the chip 101 and the imaging device.

Furthermore, the information input apparatus 102 can update the chip 101 according to a communication protocol with the chip 101, e.g., upgrade or reset the chip 101. If a function of the imaging device is upgraded, the chip 101 associated with the imaging device may be no longer suitable for working in conjunction with the upgraded imaging device, therefore the chip 101 needs to be upgraded. Upgrading can be done via a communication protocol in the information input apparatus 102, which can be the same as an aforementioned communication protocol, or can be a dedicated communication protocol for upgrading. Thus, the flexibility of chip alternation is further improved.

Furthermore, the information input apparatus 102 is adapted to detect whether the chip 101 is functional. The information input apparatus 102 can detect whether the chip 101 is functional according to a communication protocol between the chip 101 and the imaging device.

Furthermore, the information input apparatus 102 is adapted to prompt an alert if a detection result is that the chip 101 is not functional.

In an embodiment of the invention, complete communication protocols are inputted during manufacture of the chip. Accordingly, chip data can be stored in the information input apparatus 102.

Alternatively, a common part of the chip data is inputted during manufacture of the chip, in addition to the complete communication protocols. A difference part of the chip data is stored in the information input apparatus 102.

Alternatively, a common part of the communication protocols is inputted during manufacture of the chip. Accordingly, a difference part of the communication protocols and the chip data are stored in the information input apparatus 102.

Alternatively, a common part of the communication protocols and a common part of the chip data are inputted during manufacture of the chip. A difference part of the communication protocols and a difference part of the chip data can be stored in the information input apparatus 102.

Particularly, when communication protocols are inputted to the chip 101, chip data are also inputted to the chip 101. The chip data includes chip information data, and characterize data and control data corresponding to the type of the imaging device. Generally, the chip 101 is not inputted with data during manufacture. All data are inputted to the chip 101 by a user using the information input apparatus 102 via the connection apparatus according to the imaging device to be used.

For example, a company A produces three types of printers, printer A, printer B and printer C. Communication protocols between the three types of printers and corresponding chips are the same, but, characterize data (also know as identification code) corresponding to printer A is A123, characterize data corresponding to printer B is B123, and characterize data corresponding to printer C is C123. In addition, chip information data corresponding to the three types of printers are different. Therefore, during manufacture, complete communication protocols are inputted to a chip, and a user can input corresponding chip data to the chip using the information input apparatus according to each type of printers. Thus, a printer used by a user can be used in conjunction with an imaging cartridge installed with the chip to produce images.

In addition, some communication protocols between the imaging device and the chip are just slightly different. Therefore, the chip can be produced in a way that a common part of the communication protocols are inputted, and a different part of the combination protocols and chip data are stored in the associated information input apparatus.

For example, a company B produces printers of type X and type Y. The communication protocol between type X printer and the chip is communication protocol D, the communication protocol between type Y printer and the chip is communication protocol E. Communication protocols D and E are similar, and synchronization method, transmission speed, transmission procedure, error detection and correction method, and control character definition of which are the same. These parts are referred to as communication protocol F, and the different parts in communication protocol D and communication protocol E are referred to as communication protocol G and communication protocol H. During manufacture, the same communication protocol F is inputted in a chip; if the imaging device used by a user is a type X printer, the user inputs communication protocol G and corresponding chip data to the chip using the information input apparatus through a connection apparatus; if the imaging device used by a user is a type Y printer, the user inputs communication protocol II and corresponding chip data to the chip using the information input apparatus through a connection apparatus. Therefore, a chip with limited resource space can be used by a customer in different types of imaging devices. Costs and stock size of the customer are reduced.

However, some times a part of common data, such as a common part of chip information data for the chip to be applied to different types of imaging devices, is inputted during manufacture, then corresponding data is inputted by a user according to the type of a imaging device to be used. For example, if a chip uses a PIC single-chip processor for control and storage, because the space of the EEPROM of low-end PIC single-chip microprocessor is limited, a common part of a part of chip information data for the chip to be applied to different types of imaging devices has to be stored in the FLASH. Because the FLASH of PIC single-chip processors are written page by page and inconvenient to be rewritten, data of the common part has to be inputted to the chip together with the communication protocols during manufacture. Therefore, data of the difference part in addition to the data that has been written during the manufacture are stored in the information input apparatus for the user to use according to the needs. Thus, in both of the two situations where complete communication protocols are inputted and a common part of the communication protocols are inputted to the information input apparatus, a common part of chip data can be inputted to the chip, and a difference part of the chip data can be inputted to the information input apparatus, then the information input apparatus can input the difference part of the chip data to the chip according to the needs.

As can be seen from the embodiments of the invention, a user can input alternative information needed by the user to the chip using an associated information input apparatus through a connection apparatus, so that the user can obtain the final chip installed on the imaging cartridge. Therefore, it is possible for a particular type of chips to be installed on multiple types of imaging devices, compatibility of the chips is greatly improved, stock size of the user is reduced, and costs are also reduced.

Figure 2:
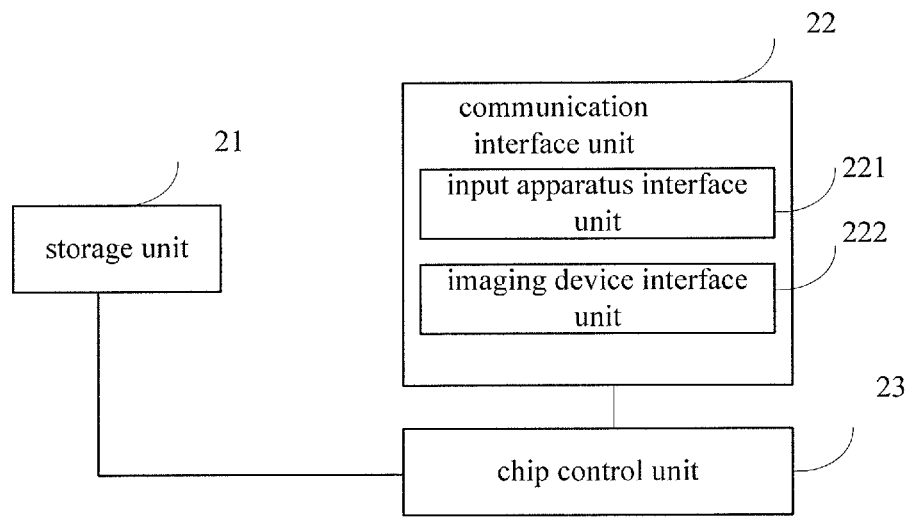
FIG. 2 is a structural diagram of a chip according to an embodiment of the invention.

FIG. 2 illustrates a structural diagram of a chip according to an embodiment of the invention.

The chip includes a storage unit 21, a communication interface unit 22 and a chip control unit 23.

The storage unit 21 is adapted to store universal information and alternative information; the communication interface unit is adapted to provide a communication interface for communication between an external device and the chip; the chip control unit is adapted to control communication between the chip and the external device.

In the embodiment, the communication interface unit 22 includes: a input apparatus interface unit 221 and an imaging device interface unit 222;

the input apparatus interface unit 221 is adapted to provide a communication interface for communication between the chip and the information input apparatus;

the imaging device interface unit 222 is adapted to provide a communication interface for communication between the chip and the imaging device.

The input apparatus interface unit 221 and the imaging device interface unit 222 can be the same interface unit, for example, a contact for communication between the chip and the imaging device can be used as the input apparatus interface unit 221.

The imaging device interface unit 222 is further adapted to provide a communication interface for the information input apparatus to detect whether the chip is functional.

When the chip is a wireless chip, the communication between the chip and the external device is performed using a chip interface unit for the chip and the information input apparatus, such as a coil, an infrared interface and any module that may implement wireless communication.

Chip data can be input by two steps: universal information is already stored in a chip when the chip is produced, and when the chip is provided to a user, the user can input alternative information needed by the user to the chip using an associated information input apparatus, and the scopes of the universal information and the alternative information are defined efficiently so that the difficulty of the user's secondary operation is reduced. Therefore, it is possible for a particular type of chips to be installed on multiple types of imaging devices, and chip compatibility is greatly improved.

In addition, when implementing manufacture on a large scale, since an Application Specific Integrated Circuit (ASIC)

has a lower cost of manufacture, an ASIC may be used to manufacture the chip, and therefore, the storage unit and the control unit can be integrated together to reduce the cost of the chip. By using the ASIC, the communication protocol to be used by the chip can be implemented by hardware such as a circuit, and partial information of the chip can be solidified in the circuit. Therefore, the chip in the associated system of the imaging cartridge may not store the universal information during a manufacture process, then, a user may write a needed part of alternative information into the chip by using associated information input apparatus after the chip is provided to the user.

Figure 3:
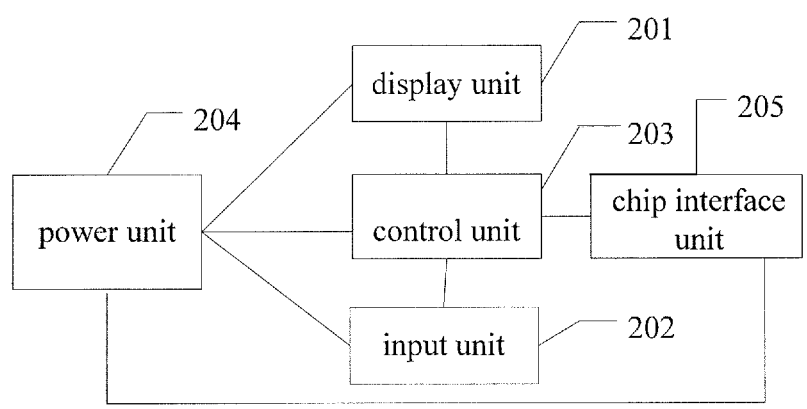
FIG. 3 is a structural diagram of an information input apparatus according to an embodiment of the invention.

FIG. 3 illustrates an embodiment of the information input apparatus of the invention, including:

a display unit 201, an input unit 202, a control unit 203, a power unit 204, and a chip interface unit 205;

the display unit 201 is adapted to display a working status and an information indication of the information input apparatus;

the input unit 202 is adapted to input to the control unit an instruction providing alternative information;

the control unit 203 is adapted to receive the instruction inputted by the input unit, extract the alternative information, and send the alternative information to the chip through the chip interface unit;

the power unit 204 is adapted to provide power for the information input apparatus;

the chip interface unit 205 is adapted to provide a communication interface for communication between the information input apparatus and the chip.

Furthermore, the information input apparatus can include an external storage unit (not shown in the figure) adapted to store the alternative information.

Normally, the control unit 203 is a single-chip processor which includes a storage, therefore data to be stored can be stored in the storage. Furthermore, the information input apparatus can include an external storage unit adapted to store the alternative information. The control unit 203 is further adapted to provide the alternative information corresponding to the instruction from the external storage unit. That is, data that needed by the information input apparatus can be stored entirely in the storage of the control unit 203, or can be stored partially in the external storage unit.

Furthermore, the information input apparatus can include an output apparatus interface unit (not shown in the figure) adapted to provide a communication interface for communication between an output apparatus, which inputs data to the information input apparatus, and the information input apparatus.

Apparently, similar to the chip, if a wireless way is used, communication between the information input apparatus and an external device is performed using a chip interface unit for the chip and the information input apparatus, such as a coil, an infrared interface and any module that may implement wireless communication.

The control unit 203 in the information input apparatus is further adapted to control the information input apparatus to detect whether the chip is functional. Here, the display unit can be adapted to display a detection result.

For example, the information input apparatus simulates an imaging device detecting a chip to detect the chip via a contact of the chip. For example, the information input apparatus exchange information with the chip though a contact of the chip according to a communication protocol between a corresponding type of imaging devices and the chip, and if a component of a peripheral circuit of the chip is broken or the communication protocol stored in the chip is not right, the information input apparatus can not exchange information with the chip properly, which leads to a display of communication fault. Furthermore, if there is an error in the data of the chip, the information input apparatus will find the error by exchanging information with the chip and comparing with corresponding data stored by itself, then the information input apparatus can display it through the display unit 201. Therefore, the information input apparatus can detect the condition of the chip, and the user can use it trouble-free.

Furthermore, corresponding to the detection function of the information input apparatus, the information input apparatus can include an alert unit (not shown in the figure) adapted to prompt an alert if the information input apparatus detects that the chip is not functional. Therefore, the effect of error indication can be improved.

The display unit 201 can include a Liquid-crystal display and the like, so that the user can be notified timely with a working status of the information input apparatus, and a user-friendly interface can be displayed. The input unit 202 can include a device with information input function such as a keyboard input device and a touch-sensing input device. The control unit 203 can include a device with control function such as a PIC single-chip processer. The chip interface unit 205 can include a device which implements information interaction such as contact structure, so that information can be interacted.

The information input apparatus of the present disclosure can be connected to a personal computer via the above input unit, then a user can input all kinds of control instructions to the information input apparatus by the personal computer, so as to write the needed part of alternative information into the chip or detect the chip, and display working status and operation result of the information input apparatus on the personal computer. In such a case, the information input apparatus may not have a display unit, which provides benefits in volume and cost.

As can be seen from the embodiment, an associated information input apparatus is provided to be used in conjunction with the chip. Therefore, chip data can be input by two steps: universal information is already stored in a chip when the chip is produced, and when the chip is provided to a user, the user can input customized information needed by the user to the chip using the information input apparatus. Thus, it is possible for a particular type of chips to be installed on multiple types of imaging devices, and chip compatibility is greatly improved.

Figure 4:
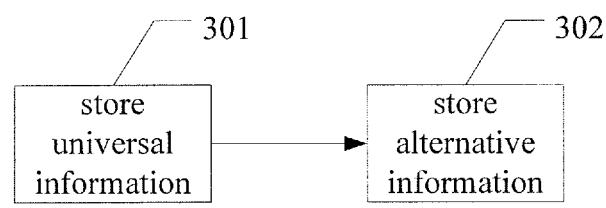
FIG. 4 is a flow chart of a chip information input method according to an embodiment of the invention.

FIG. 4 illustrates an information input method for a chip according to an embodiment of the invention, including:

step 301: storing universal information into the chip;

step 302: storing alternative information into the chip after storing the universal information.

As can be seen from the embodiment, chip data can be input by two steps: first, universal information is already stored in a chip when the chip is produced, and second, when the chip is provided to a user, the user can input alternative information needed by the user to the chip using an associated information input apparatus, and the scopes of the universal information and the alternative information are defined efficiently so that the difficulty of the user's secondary operation is reduced. Therefore, it is possible for a particular type of chips to be installed on multiple types of imaging devices, and chip compatibility is greatly improved.

Those skilled in the art should understand that all or a part of the steps of the method of the above embodiment can be implemented by a program instructing related hardware. The program can be stored in a computer readable storage medium. While being executed, the program includes the following steps:

storing universal information into the chip;

storing alternative information into the chip after storing the universal information.

An information input method, an information input apparatus and an information input system for an associated apparatus of an imaging device provided by the embodiments of the invention are described above. The principle and embodiments of the invention are illustrated by example, which is solely for a better understanding of the method and the core idea of the invention. Furthermore, alternations can be made to the embodiments and applications of the invention by those skilled in the art according to the idea of the invention. Therefore, the content of the specification should not be understood as a limitation to the invention.

The invention claimed is:

1. An associated system of an imaging cartridge, comprising: a chip and an information input apparatus;
wherein the chip is adapted to store a needed part of alternative information sent by the information input apparatus;
the information input apparatus is adapted to store alternative information and send to the chip the needed part of alternative information according to the type of one imaging device used with the chip;
wherein the alternative information includes communication protocols between the chip and different types of imaging devices, chip data for the chip to be applied to different types of imaging devices, or a combination thereof.

2. The associated system of an imaging cartridge according to claim 1, further comprising:
a connection apparatus, adapted to provide a transmission channel for communication between the information input apparatus and the chip.

3. The associated system of an imaging cartridge according to claim 1, wherein, for chips of different contact structure types, a corresponding connection apparatus are different.

4. The associated system of an imaging cartridge according to claim 1, wherein, the information input apparatus and the chip communicate in a wireless way.

5. The associated system of an imaging cartridge according to claim 1, wherein,
the information input apparatus is further adapted to upgrade the chip according to a communication protocol between the information input apparatus and the chip.

6. The associated system of an imaging cartridge according to claim 1, wherein,
the information input apparatus is further adapted to reset the chip according to a communication protocol between the information input apparatus and the chip.

7. The associated system of an imaging cartridge according to claim 1, wherein,
the information input apparatus is further adapted to detect whether the chip is functional according to a communication protocol between the imaging device and the chip.

8. The associated system of an imaging cartridge according to claim 7, wherein,
the information input apparatus is further adapted to prompt an alert indication if a detection result is that the chip is not functional.

9. The associated system of an imaging cartridge according to claim 1, wherein,
the alternative information comprises: a difference part of the communication protocols between the chip and different types of imaging devices, and chip data for the chip to be applied to different types of imaging devices; or
the alternative information comprises: a difference part of the communication protocols between the chip and different types of imaging devices, and a difference part of chip data for the chip to be applied to different types of imaging devices; or
the alternative information comprises: chip data for the chip to be applied to different types of imaging devices; or
the alternative information comprises: a difference part of chip data for the chip to be applied to different types of imaging devices.

10. An information input apparatus, comprising:
an input unit, a control unit, a power unit, and a chip interface unit;
the input unit is adapted to input to the control unit an instruction providing alternative information;
the control unit is adapted to receive the instruction inputted by the input unit, extract the alternative information, and send a needed part of the alternative information to a chip through the chip interface unit according to the type of one imaging device used with the chip;
the power unit is adapted to provide power for the information input apparatus;
the chip interface unit is adapted to provide a communication interface for communication between the information input apparatus and the chip;
wherein the alternative information includes communication protocols between the chip and different types of imaging devices, chip data for the chip to be applied to different types of imaging devices, or a combination thereof.

11. The information input apparatus according to claim 10, wherein, a connection apparatus is provided to connect the information input apparatus and the chip.

12. The information input apparatus according to claim 11, wherein, for chips of different contact structure types, the corresponding connection apparatus are different.

13. The information input apparatus according to claim 10, further comprising:
an external storage unit, adapted to store alternative information.

14. The information input apparatus according to claim 10, further comprising:
an output apparatus interface unit, adapted to provide a communication interface for communication between an output apparatus which outputs data to the information input apparatus and the information input apparatus.

15. The information input apparatus according to claim 10, wherein, the control unit is further adapted to control the information input apparatus to detect whether the chip is functional.

16. The information input apparatus according to claim 15, further comprising:
an alert unit, adapted to prompt an alert indication if the information input apparatus detects that the chip is not functional.

17. The information input apparatus according to claim 10, wherein,
the alternative information comprises: a difference part of the communication protocols between the chip and different types of imaging devices, and chip data for the chip to be applied to different types of imaging devices; or the alternative information comprises: a difference part of the communication protocols between the chip and different types of imaging devices, and a difference part of chip data for the chip to be applied to different types of imaging devices; or the alternative information comprises: chip data for the chip to be applied to different types of imaging devices; or the alternative information comprises: a difference part of chip data for the chip to be applied to different types of imaging devices.

18. A non-transitory computer-readable storage medium storing a computer program for causing a computer to execute an information input method for a chip, the information input method comprising:

storing universal information into the chip;

storing a needed part of alternative information according to the type of one imaging device used with the chip into the chip after storing the universal information;

wherein the alternative information includes communication protocols between the chip and different types of imaging devices, chip data for the chip to be applied to different types of imaging devices, or a combination thereof.

19. The non-transitory computer-readable storage medium according to claim 18, wherein:

the universal information comprises: a common part of communication protocols between the chip and different types of imaging devices; the alternative information comprises: a difference part of the communication protocols between the chip and different types of imaging devices, and chip data for the chip to be applied to different types of imaging devices; or the universal information comprises: a common part of communication protocols between the chip and different types of imaging devices, and a common part of chip data for the chip to be applied to different types of imaging devices; the alternative information comprises: a difference part of the communication protocols between the chip and different types of imaging devices, and a difference part of chip data for the chip to be applied to different types of imaging devices; or the universal information comprises: a universal communication protocol between the chip and different types of imaging devices; the alternative information comprises: chip data for the chip to be applied to different types of imaging devices; or the universal information comprises: a universal communication protocol between the chip and different types of imaging devices, and a common part of chip data for the chip to be applied to different types of imaging devices; the alternative information comprises: a difference part of chip data for the chip to be applied to different types of imaging devices.

* * * * *